United States Patent
Wornham

(10) Patent No.: US 10,787,120 B2
(45) Date of Patent: Sep. 29, 2020

(54) FOLDABLE WARNING TRIANGLE ASSEMBLY

(71) Applicant: Road Safety Designs Limited, Penarth South Wales (GB)

(72) Inventor: Stephen Wornham, Penarth South Wales (GB)

(73) Assignee: ROAD SAFETY DESIGNS LIMITED, Cardiff (GB)

( * ) Notice: Subject to any disclaimer, the term of this patent is extended or adjusted under 35 U.S.C. 154(b) by 0 days.

(21) Appl. No.: 16/337,670

(22) PCT Filed: Sep. 29, 2017

(86) PCT No.: PCT/GB2017/052937
§ 371 (c)(1),
(2) Date: Mar. 28, 2019

(87) PCT Pub. No.: WO2018/060733
PCT Pub. Date: Apr. 5, 2018

(65) Prior Publication Data
US 2019/0225148 A1    Jul. 25, 2019

(30) Foreign Application Priority Data
Sep. 30, 2016  (GB) .................................. 1616697.7

(51) Int. Cl.
*B60Q 7/00* (2006.01)
*G09F 13/22* (2006.01)
(Continued)

(52) U.S. Cl.
CPC ............. *B60Q 7/00* (2013.01); *G09F 13/005* (2013.01); *G09F 13/22* (2013.01);
(Continued)

(58) Field of Classification Search
CPC ......... B60Q 7/00; G09F 13/005; G09F 13/22; G09F 15/0062; G09F 19/22;
(Continued)

(56) References Cited

U.S. PATENT DOCUMENTS 3,262,415 A    7/1966  Rocco
3,589,328 A *  6/1971  Kiniry .................... B60Q 7/005
                                                116/63 P
(Continued)

FOREIGN PATENT DOCUMENTS

AU         7629981 A    4/1983
CN         2219526 Y    2/1996
(Continued)

OTHER PUBLICATIONS

"Online search for rotary lock," http://www.bing.com/images/search?q=rotary+lock&FORM=AWIR [Accessed on May 25, 2017], 1 page.
(Continued)

Primary Examiner — Ojiako K Nwugo
(74) Attorney, Agent, or Firm — Fredrikson & Byron, P.A.

(57) ABSTRACT

A foldable warning triangle assembly (100) comprising three arms (112,114,116) configurable as a triangle. The three arms (112,114,116) are configurable as a triangle, wherein the three arms (112,114,116) are pivotably connected together at pivot points (118,120,122) such that they can pivot into a collapsed arrangement without disconnecting the three arms (112,114,116). The assembly (100) also comprises an electrical switch within a first arm of the three arms (112,114,116) arranged adjacent a pivot point between the first arm of the three arms and a second arm of the three arms. Further, a surface of the second arm is arranged to apply force on the electrical switch such that the electrical
(Continued)

switch is configured to close when the three arms (112,114, 116) are fully configured as a triangle thereby completing an electrical circuit of the warning triangle.

19 Claims, 16 Drawing Sheets

(51) Int. Cl.
  *G09F 15/00* (2006.01)
  *G09F 19/22* (2006.01)
  *G09F 13/00* (2006.01)
  *G09F 13/04* (2006.01)

(52) U.S. Cl.
  CPC .......... *G09F 15/0062* (2013.01); *G09F 19/22* (2013.01); *G09F 2013/0463* (2013.01); *G09F 2013/0472* (2013.01); *G09F 2013/222* (2013.01)

(58) Field of Classification Search
  CPC ..... G09F 2013/0472; G09F 2013/0463; G09F 2013/222
  USPC .......................................................... 340/473
  See application file for complete search history.

(56) References Cited

U.S. PATENT DOCUMENTS

| | | | | |
|---|---|---|---|---|
| 3,600,059 | A * | 8/1971 | Evans | B60Q 7/005 359/553 |
| 3,625,177 | A * | 12/1971 | Miller | B60Q 7/005 116/63 P |
| 3,759,214 | A * | 9/1973 | Evans | B60Q 7/005 116/63 P |
| 3,806,234 | A * | 4/1974 | Brudy | B60Q 7/005 359/553 |
| 3,975,849 | A | 8/1976 | Tuleja | |
| 4,952,910 | A * | 8/1990 | Straten | B60Q 7/00 340/473 |
| 5,551,370 | A | 9/1996 | Hwang | |
| D401,878 | S | 12/1998 | Evanyk | |
| 5,970,639 | A | 10/1999 | Hui | |
| D446,465 | S | 8/2001 | Sloot | |
| 6,389,720 | B1 * | 5/2002 | Hsieh | B60Q 7/00 116/63 T |
| 6,535,117 | B2 * | 3/2003 | Haerer | B60Q 7/00 116/63 T |
| D544,804 | S | 6/2007 | Chen | |
| 7,258,506 | B2 * | 8/2007 | Tipaldo | E01F 9/688 116/63 P |
| D557,625 | S | 12/2007 | Yu | |
| 7,872,592 | B2 * | 1/2011 | Greenhoe | G08G 1/0955 340/815.76 |
| 8,365,918 | B1 * | 2/2013 | Andino | B60Q 7/00 206/223 |
| 9,927,811 | B1 * | 3/2018 | Tseng | G05D 1/0088 |
| 2002/0171561 | A1 * | 11/2002 | Haerer | E01F 13/02 340/908 |
| 2007/0189028 | A1 * | 8/2007 | Chen | B60Q 7/00 362/545 |
| 2008/0218329 | A1 | 9/2008 | Fan et al. | |
| 2009/0308304 | A1 | 12/2009 | Ho | |
| 2012/0056757 | A1 | 3/2012 | Caudill | |
| 2012/0262933 | A1 * | 10/2012 | Larsson | B60Q 3/35 362/496 |
| 2013/0016497 | A1 | 1/2013 | Anderson | |
| 2014/0140082 | A1 * | 5/2014 | Kuboyama | H01L 25/0753 362/510 |
| 2015/0073623 | A1 * | 3/2015 | Zhang | G05D 1/0011 701/2 |
| 2015/0203054 | A1 | 7/2015 | Renke et al. | |
| 2018/0022273 | A1 * | 1/2018 | Chiang | B60Q 7/00 340/473 |
| 2018/0154828 | A1 * | 6/2018 | Wornham | G09F 13/16 |

FOREIGN PATENT DOCUMENTS

| | | |
|---|---|---|
| CN | 2377648 Y | 5/2000 |
| CN | 2437004 Y | 6/2001 |
| CN | 2789874 Y | 6/2006 |
| CN | 200962292 Y | 10/2007 |
| CN | 201126697 Y | 10/2008 |
| CN | 201681568 U | 12/2010 |
| CN | 201780746 U | 3/2011 |
| CN | 203631096 U | 6/2014 |
| CN | 204225004 U | 3/2015 |
| CN | 105185277 A | 12/2015 |
| DE | 29614119 U1 | 11/1996 |
| DE | 19741452 A1 | 6/1998 |
| DE | 29911991 U1 | 12/1999 |
| DE | 20021366 U1 | 8/2001 |
| DE | 20304840 U1 | 9/2003 |
| DE | 202004016041 U1 | 3/2005 |
| DE | 102004039390 A1 | 2/2006 |
| DE | 102010024470 A1 | 12/2011 |
| EP | 2147825 A1 | 1/2010 |
| FR | 2702783 A3 | 9/1994 |
| FR | 3010671 A3 | 3/2015 |
| GB | 985881 A | 3/1965 |
| GB | 2121225 A | 12/1983 |
| GB | 2254094 A | 9/1992 |
| GB | 2271012 A | 3/1994 |
| GB | 2312457 A | 10/1997 |
| GB | 2483071 A | 2/2012 |
| IE | S65975 B2 | 11/1995 |
| JP | H05-04552 A | 1/1993 |
| JP | 535491 U | 5/1993 |
| JP | 2004339928 A1 | 12/2004 |
| KR | 2020080002486 U | 7/2008 |
| KR | 101070616 B1 | 10/2011 |
| KR | 1020120012586 A | 2/2012 |
| KR | 1020120108407 A | 10/2012 |
| KR | 1020130048352 A | 5/2013 |
| KR | 200471562 Y1 | 2/2014 |
| KR | 20150056011 A | 5/2015 |
| KR | 2020160003523 U | 10/2016 |
| KR | 101686816 B1 | 12/2016 |
| TW | M499627 U | 4/2015 |
| WO | 2011013113 A1 | 2/2011 |
| WO | 2016178030 A2 | 11/2016 |

OTHER PUBLICATIONS

"Online search for multiple storage compartments," http://www.bing.com/images/search?q=multiple+storage+compartment&FORM=HDRSC2 [Accessed on May 25, 2017], 1 page.
International Patent Application No. PCT/GB2017/052937, Invitation to Pay Additional Fees and Partial Search Report dated Dec. 1, 2017, 15 pages.
UK Pat. App. No. 1616697.7, Search Report dated Feb. 8, 2017, 5 pages.
UK Pat. App. No. 1616697.7, Search Report on claims 27-34 dated May 31, 2017, 3 pages.
UK Pat. App. No. 1616697.7, Search Report on claims 35-39 dated May 31, 2017, 3 pages.
UK Pat. App. No. 1616697.7, Search Report on claims 40-45 dated May 31, 2017, 3 pages.
UK Pat. App. No. 1616697.7, Search Report on claims 46-56 dated May 31, 2017, 3 pages.
"Number Plate First Aid Kit for Motorcycles / ATVs—eBay," bobs-bike-stuff / eBay; May 12, 2015. See http://www.ebay.co.uk/itm/201087859553?orig_cvip=true—Accessed Aug. 8, 2017.

(56) References Cited

OTHER PUBLICATIONS

PCT International Search Report and Written Opinion dated Jan. 23, 2018 for Intl. App. No. PCT/GB2017/052937, from which the instant application is based, 18 pgs.

* cited by examiner

FOLDABLE WARNING TRIANGLE ASSEMBLY

RELATED APPLICATIONS

This application is a 35 U.S.C. 371 national stage filing from International Application No. PCT/GB2017/052937, filed Sep. 29, 2017, which claims priority to British Application No. 1616697.7, filed Sep. 30, 2016, the teachings of which are incorporated herein by reference.

BACKGROUND OF THE INVENTION

This invention relates to the field of road signs and signals, and particularly to the field of warning triangles.

Warning triangles are used to indicate a hazard in the road that may not be readily apparent to approaching motorists. They are used in many countries, and normally take the form of an equilateral triangle. The appearance of warning triangles varies from country to country but they are generally designed to have bright colours that are highly contrasting with the surrounding environment. This helps approaching drivers notice the warning triangle and thus avoid the hazard.

These warning triangles are routinely used by a variety of different organisations and governmental bodies such as police forces, highway agencies and breakdown services. It is also a legal requirement in many countries for motorists to carry these transportable warning triangles in their vehicle for use in the event that the vehicle breaks down at the side of the road.

Therefore, it is important for such a warning triangle to be lightweight and easy to transport, whilst remaining solid and stable when placed at the roadside. They should also be visible to approaching motorists at night and during adverse weather conditions.

The majority of warning triangles currently in use are made from materials that are heavy and rigid, which results in devices that are difficult to store and transport.

A further problem with existing warning triangles is that they generally provide no indication of the direction that an approaching motorist should take to avoid a hazard. This is an important consideration as, if motorists are travelling at night or in poor lighting, it may be difficult for them to discern the location of the hazard and therefore to determine which direction to take.

Triangles that are currently available also tend to be supported on thin legs that do not provide adequate stability. Accordingly, in adverse weather conditions, such as in high winds, or when large vehicles pass near to the triangle at high speeds, these warning triangles can become unstable.

Such warning triangles typically rely on the reflective properties of the materials they are made from to be visible at night or in poor lighting. Such warning triangles are dependent on an external light source, such as the vehicle's headlights, illuminating the triangle in order to be visible at night or in poor lighting. These reflective properties are often not sufficient to catch an approaching motorist's eye when driving in such adverse conditions. Further, the light source generally has to be directed at the warning triangle head-on for the motorist to notice the reflective properties of the material. Thus, these warning triangles can fail to adequately warn motorists of an approaching hazard.

SUMMARY OF THE INVENTION

We have appreciated the need to improve upon the existing warning triangles currently available.

The warning triangle and warning triangle assembly of the present application is defined in the claims, to which reference is now directed.

The invention comprises a number of aspects.

The first aspect provides a foldable warning triangle assembly comprising three arms configurable as a triangle. The three arms are pivotably connected together at pivot points such that they can pivot into a collapsed arrangement without disconnecting the three arms. An electrical switch is provide within a first arm of the three arms arranged adjacent a pivot point between the first arm of the three arms and a second arm of the three arms. A surface of the second arm is arranged to apply force on the electrical switch such that the electrical switch is configured to close when the three arms are fully configured as a triangle thereby completing an electrical circuit of the warning triangle.

The three arms are connected together to allow the warning triangle to be easily folded without separating any of the arms. This allows the warning triangle to be folded to a size that is practical and convenient for transportation, without any risk of losing or misplacing an arm. Further, the electrical switch is arranged such that it closes when the triangle is fully unfolded, preventing power from flowing between the arms when the warning triangle is in its folded arrangement and is not being used. This prevents needless power expenditure, increasing battery life and longevity of the electrical components.

Optionally, the first aspect further comprises an electrical switch that comprises a tactile switch arranged such that a force is exerted on the tactile switch when the three arms are fully configured as a triangle. Further, the second arm may be arranged such that the pivoting of the second arm in relation to the first arm causes the force to be exerted on the tactile switch. The tactile switch may have a button biased such that the electrical switch is open until the triangle is unfolded. The surface of the second arm may comprise a recessed area operable to receive the push the button to open the electrical switch when the triangle is folded, and the recessed area may be of variable depth.

This provides a robust and reliable electrical switch arrangement which has ingress protection.

A further aspect provides a foldable warning triangle assembly comprising a warning triangle having three arms configurable as a triangle. The assembly further comprises a housing having an interior configured to receive the warning triangle when folded, the housing having a support connector on the external surface thereof arranged to connect to a corresponding support connector of the warning triangle by sliding of the housing relative to the triangle such that, when connected, the housing provides a base for the warning triangle.

This provides a housing which doubles as a base for the warning triangle. This minimises the complexity of the warning triangle arrangement and reduces the number of components which may be required to provide a stable, solid warning triangle.

Optionally, the support connector of the housing comprises a slot and the support connector of the triangle comprises a protrusion arranged to slide along the slot. The support connector of the triangle may comprise a protrusion on each of two arm portions arranged so that the two protrusions slide into the slot of the housing. The protrusion may be arranged to house a battery of the triangle.

This provides a connection arrangement between the housing and the triangle that secures the foldable warning triangle in an unfolded arrangement when in use. Further, providing the batteries in the protrusions, which themselves are provided on each arm portion of an arm, provides improved weight distribution and improves stability of the triangle.

A further aspect provides a housing comprising an interior configured to receive the warning triangle when folded. The housing has a locking mechanism for securing the three arms within the housing. The locking mechanism comprises a locked state and an unlocked state, wherein, when the locking mechanism is in the locked state, the three arms cannot be inserted into or removed from the housing. The locking mechanism comprises a rotatable switch arranged on the housing, wherein the state of the locking mechanism can be changed by rotating the rotatable switch.

This provides a robust locking mechanism which provides ingress protection. The mechanism also secures the triangle within the housing thus preventing the triangle unfolding when not in use.

A further aspect provides a foldable warning triangle assembly comprising a warning triangle having three arms configurable as a triangle. The assembly further comprises a housing comprising an interior configured to receive the warning triangle when folded through a first opening. The housing further comprises an externally accessible storage compartment accessible through a second opening.

Optionally, the first opening has a lid and the second opening is arranged through the lid such that, when the lid is connected to the container, the externally accessible storage compartment is a portion of the housing that is not occupied by the three arms when the three arms are within the housing.

This provides additional storage space, efficiently arranged on the housing to make the most of the available space within the housing and to be accessible externally without having to access the interior space of the housing.

A final aspect provides a foldable warning triangle assembly comprising a warning triangle having three arms configurable as a triangle, each of the arms having an array of lights. The assembly further comprises a control module connected to the array of lights of each arm. The control module is arranged to control the illumination of the array of lights of each arm to provide a pattern of illumination. The pattern of illumination comprises the arrays of lights illuminating in a sequence in which the arrays of two of the three arms are illuminated to produce a direction indicator.

This provides an arrangement which provides a clearly visible warning to oncoming motorists of an approaching hazard and provides them with an indication of which direction to travel in order to avoid the hazard.

BRIEF DESCRIPTION OF THE DRAWINGS

The invention will be described in more detail by way of example with reference to the accompanying drawings, in which.

DESCRIPTION OF A PREFERRED EMBODIMENT OF THE INVENTION

A device embodying the invention will now be described with reference to the figures. The warning triangle assembly has a number of aspects which may be used in combination or separately. For ease of understanding each aspect will be described in turn.

Warning Triangle Illumination

Figure 1:
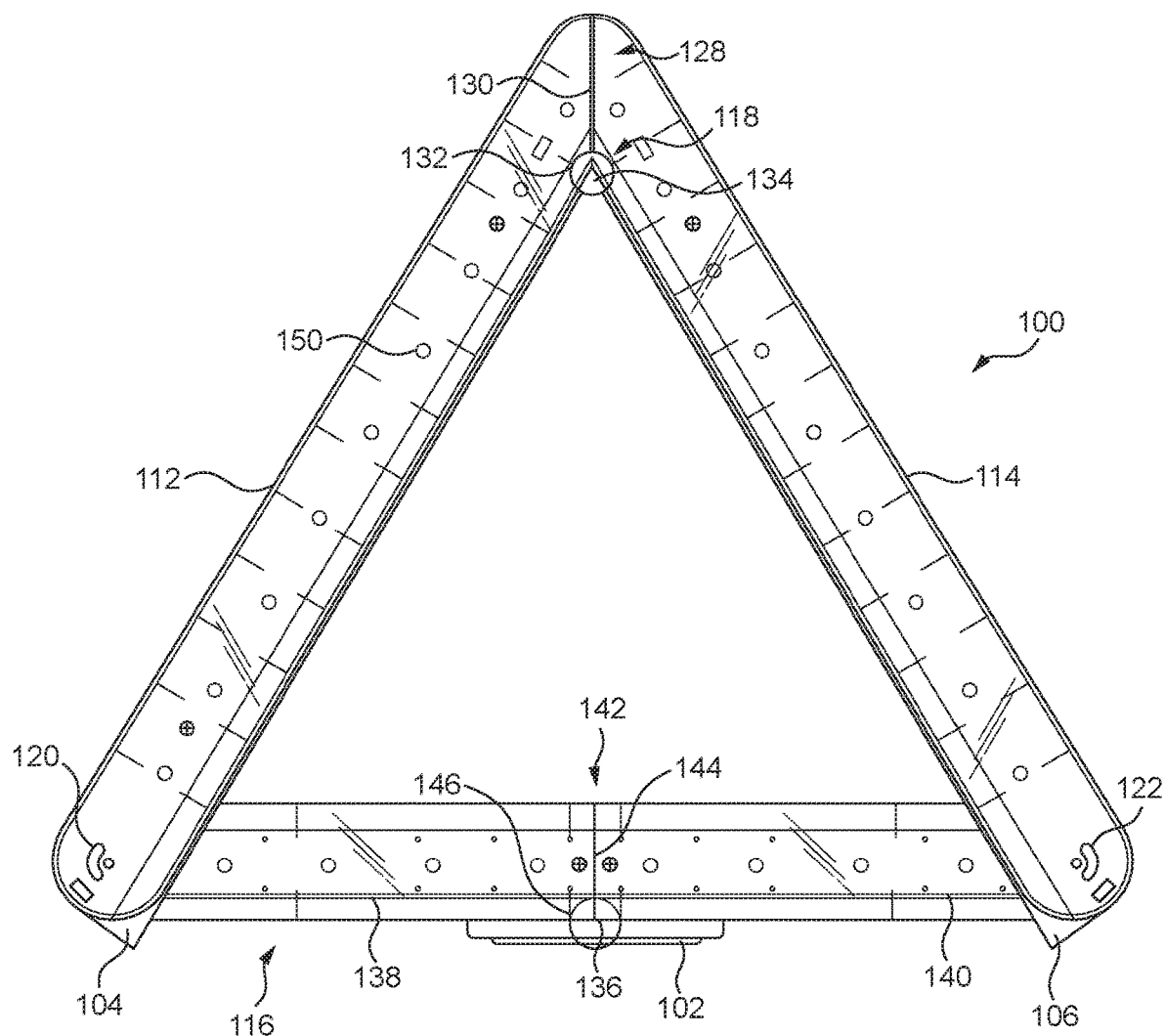
FIG. 1 is a front view of a warning triangle assembly according to an embodiment of the invention showing the three arms of the assembly forming a triangle.

Referring initially to FIG. 1, a warning triangle (100) according to an embodiment of the invention comprises three arms (112), (114) and (116) configurable as a triangle. These arms (112), (114) and (116) are made from a rigid plastic material and have a substantially greater length than they have width. The arms (112), (114) and (116) of warning triangle (100) are a size that is appropriate for transportation, such that they can easily fit in the boot of a car or other vehicle.

The material of the front surface of arms (112), (114) and (116) may be made from a substantially transparent material that covers a surface that is designed to be visually eye-catching. The visually eye-catching surface may comprise a plurality of lights, reflectors or both. The visually eye-catching surface may be made from a material of a bright colour, or the front surface may be made from a material of a bright colour or they both may be made from a material of a bright colour.

The arms (112), (114) and (116) may be connected to each other at connection points, which may be described as pivot points (118), (120) and (122), positioned at each end of each arm (112), (114) and (116). At these connection points (118), (120) and (122), each arm (112), (114) and (116) has a connector that securely attaches the ends of each arm (112), (114) and (116) together to form a triangle. The connectors of each arm may be any connector suitable for connecting to a corresponding connector of another arm. For example, the connector of arm (112) at connection point (120) may be a peg configured to connect to a corresponding hole arranged on arm (116). Alternatively, screw fit connectors, nut and bolt combination, or any other suitable connection may be used. Arm (116) is arranged to form the bottom side of the triangle when in use. The two remaining arms (112) and (114) connect to the bottom arm (116) at connection points (120) and (122), located at either end of the bottom arm (116).

The ends of the arms (112) and (114) that are not connected to the bottom arm (116) are shaped such that each end comprises a coupling edge (128) that has a flat edge section (130) and a curved edge section (132). The coupling edges (128) are located at connection point (118) at the top of the warning triangle assembly when in use. The curved edge section (132) of each coupling edge (128) is located at the end of the edge (128) that is closest to the bottom arm (116). The flat edge sections (130) of each arm oppose one another at connection point (118) such that the flat edge section of arm (112) is in contact with the flat edge section of arm (114) along the entirety of its length. The arms (112) and (114) are connected together by a top connector (134). The top connector (134) is located adjacent the curved edge section (132) of the arms (112) and (114). The curved edge sections are shaped to conform with the surface of the top connector (134) such that the top connector (134) is in contact with the entirety of curved edge section of both arms. The arms (112) and (114) are connected to the top connector (134) such that they can pivot about the top connector (134), which acts as a pivot point. This allows the flat edge sections (130) of each arm to be separated and brought together.

The bottom arm (116) comprises two arm portions (138) and (140). These arm portions are preferably of equal length but may alternatively be different lengths. One end of arm portion (138) is connected to arm (112) and one end of arm portion (140) is connected to arm (114). The other end of each arm portion has a coupling edge (142). Like with the coupling edges (128) that are positioned at the top of the warning triangle assembly when in use, the coupling edges (142) each have a flat edge section (144) and a curved edge section (146). The curved edge sections are located at the end of the coupling edges (142) that are farthest from top connector (134). The two flat edges sections may be brought together half way between connection points (122) and (120), such that the flat edge sections (144) are parallel and opposed to one another. The two arm portions are connected together by a bottom connector (136), located adjacent the curved edge section (146) of arm portions (138) and (140). The curved edge sections are shaped to conform with the surface of the bottom connector (136) such that the bottom connector (136) is in contact with the entirety of the curved edge section of both arm portions. The bottom connector (136) may be substantially identical to connector (134). The arm portions (138) and (140) are connected to the bottom connector (136) such that they can pivot about the bottom connector (136), which acts as a pivot point. This allows the coupling edges (142) of each arm portion to move closer to top connector (134).

Connectors (134) and (136) allow the warning triangle assembly (100) to be folded into a compact arrangement without having to disconnect any of the arms. This folding procedure will now be described with reference to FIGS. 2-5.

Figure 2:
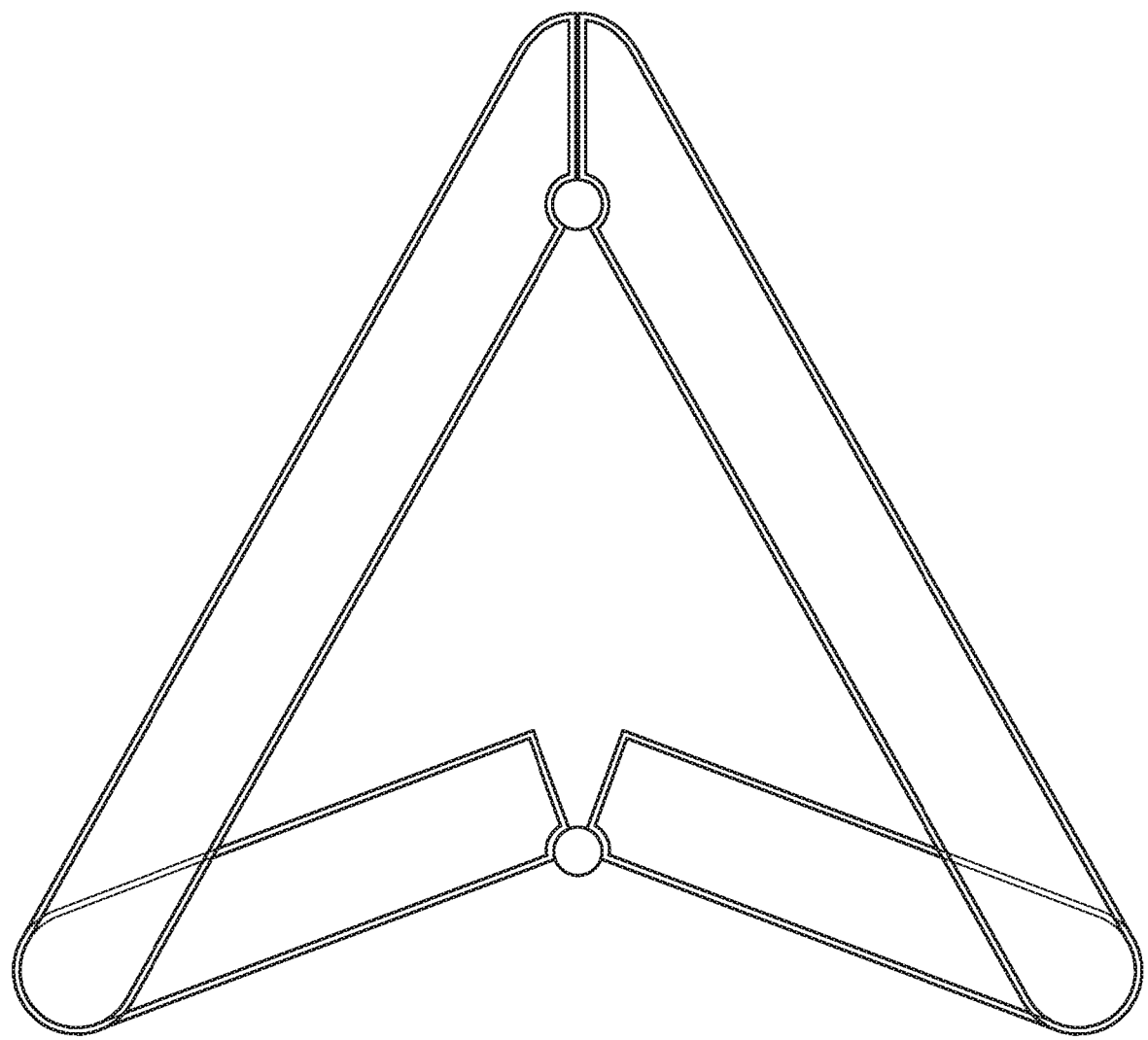
FIG. 2 is a schematic representation of the folding mechanism according to the embodiment of the invention showing the warning triangle substantially unfolded.
Figure 3:
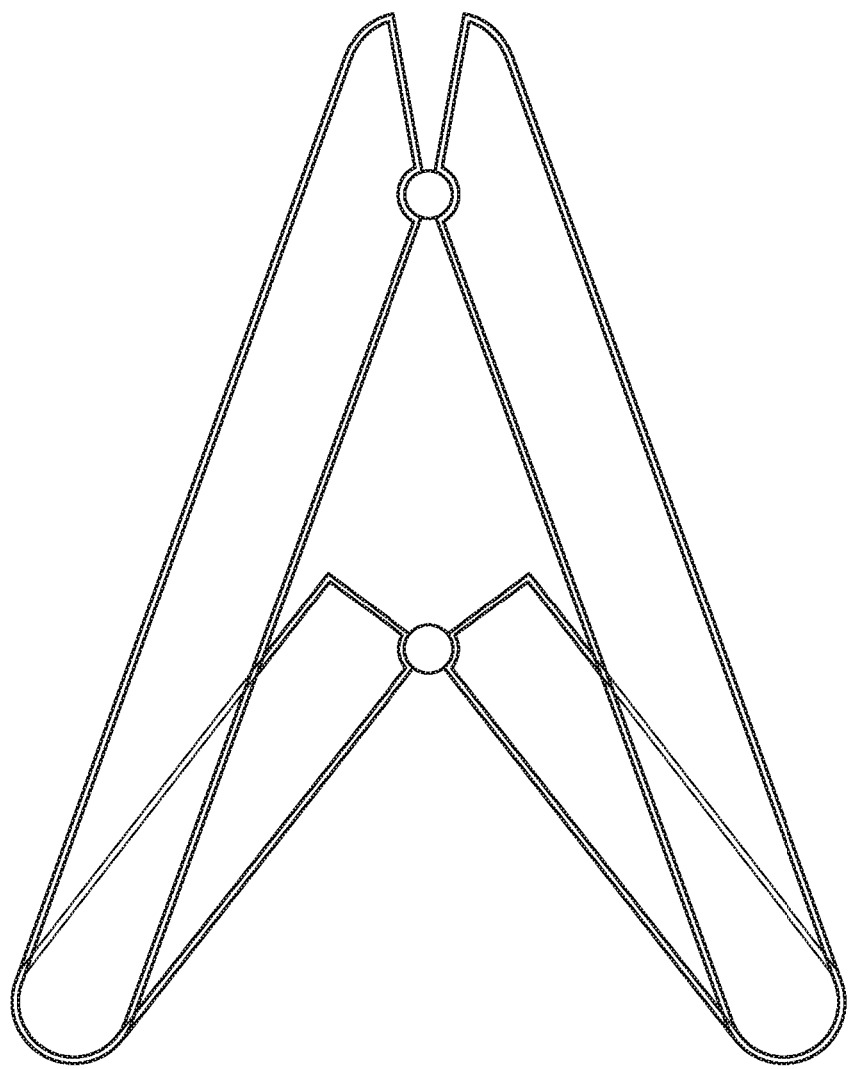
FIG. 3 is a schematic representation of the folding mechanism according to the embodiment of the invention showing the warning triangle partially folded.
Figure 4:
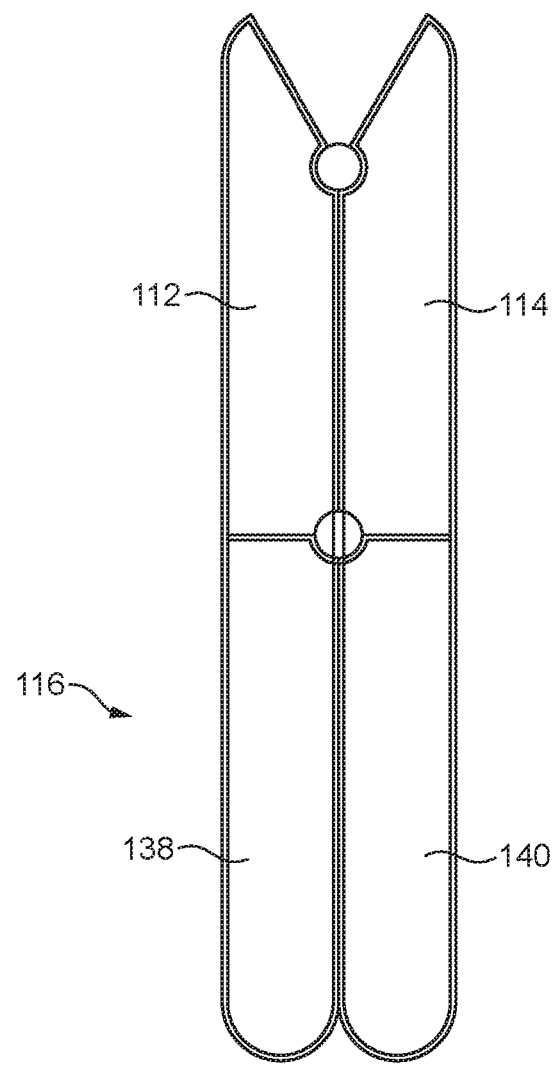
FIG. 4 is a schematic representation of the folding mechanism according to the embodiment of the invention showing the warning triangle fully folded.

The bottom connector (136) and the connectors located at connection points (122) and (120) act as pivot points for the two arm portions (138) and (140). These pivot points allow the ends of the arm portions not connected to arms (112) and (114) to move toward top connector (134). As the arm portions continue to pivot, arms (112) and (114) are forced to pivot about top connector (134). This brings the two arms closer together and forces the coupling edge (128) of each arm to separate. Such an arrangement is shown in FIGS. 2 and 3. Eventually, arms (112) and (114) are brought alongside each other, and arm (116) is folded such that the ends of the arm portions that are connected to arms (112) and (114) are brought alongside one another. This is shown in FIG. 4.

Warning triangle (100) has supports, here described as feet (102), (104) and (106). The foot (102) is located adjacent to pivot point (136) of the bottom arm of the triangle. Foot (104) is located on arm (112) adjacent the connection point (120) between arm (112) and the bottom arm (116), and foot (106) is located on arm (114) adjacent the connection point (122). These feet provide stable points of contact between the base of the warning triangle and the ground. Further, warning triangle (100) may comprises an array of lights (150) on each arm (112), (114) and (116). Lights (150) may comprise LED bulbs and are connected together by an appropriate electrical circuit.

As will be described in greater detail below, an electrical switch arranged adjacent a pivot point between a first arm of the three arms and a second arm of the three arms. The electrical switch is configured to close when the warning triangle is fully unfolded thereby completing an electrical circuit between the arms. Here, an electrical switch is provided at the connection point (120) between the arm (112) and the bottom arm (116). However, it will be appreciated that the electrical switch may be provided at a different location, for example at connection point (122), (118) or adjacent the pivot point (136) of the bottom arm. The electrical switch is arranged such that the switch is open (off) when the warning triangle is folded and closed (on) when the warning triangle is unfolded. Therefore, current cannot flow through the electrical circuit of the warning triangle (100) unless the arms are fully unfolded. This arrangement ensures that motorists cannot unwittingly leave power flowing to lights (150) once they have folded warning triangle assembly (100) ready for transportation.

Figure 5:
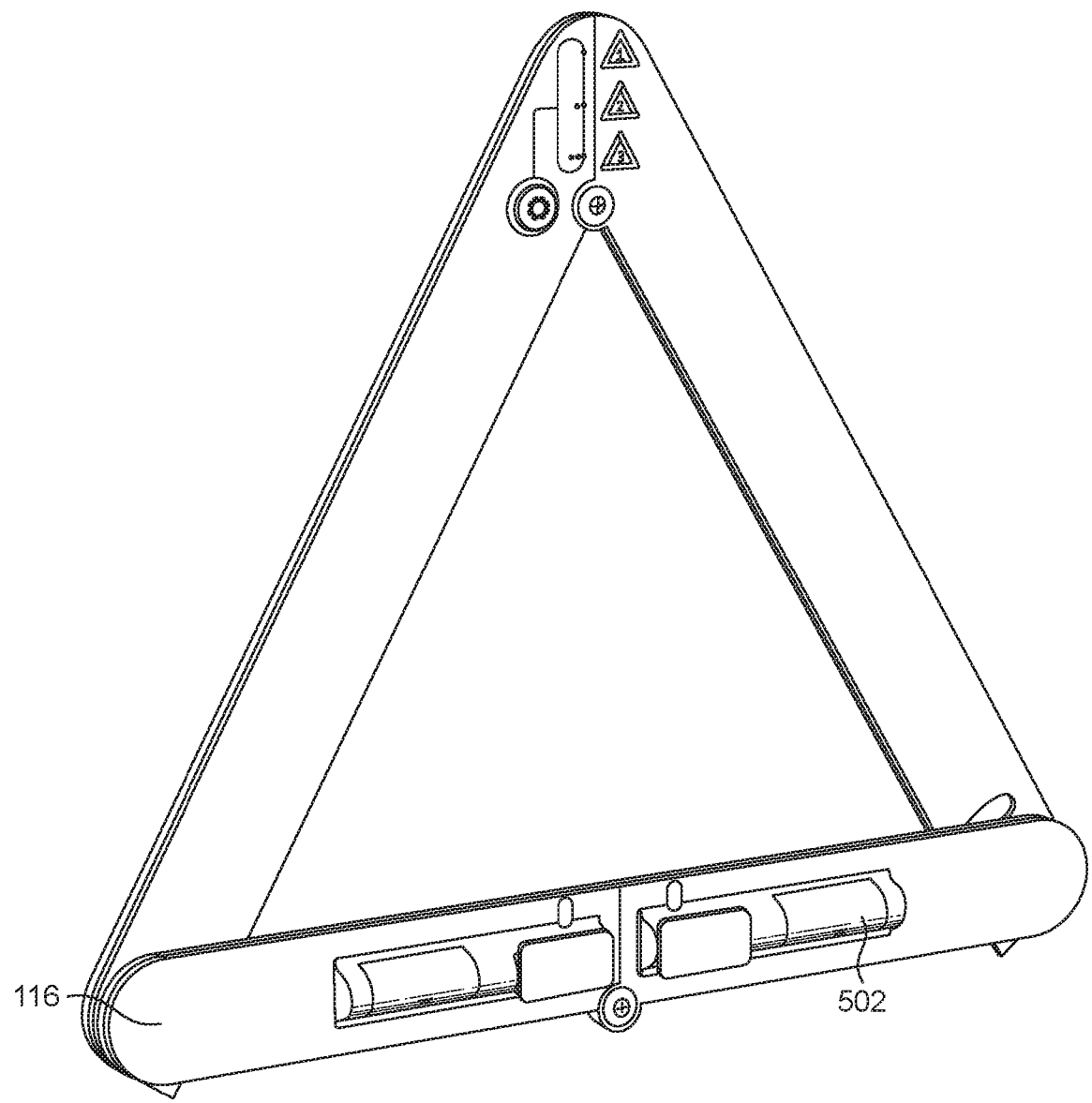
FIG. 5 is a rear view of a warning triangle assembly according to the embodiment of the invention showing the three arms of the assembly forming a triangle.

As shown in FIG. 5, the lights (150) may be powered by one or more batteries (502). Here, the batteries (502) are located in the bottom arm (116), but either of the other arms may house the batteries. Alternatively, the power source for the lights (150) may be housed externally. For example, batteries may be located in the warning triangle's housing (described later), or the warning triangle may be connected directly to the mains or to a vehicle's battery. Preferably, the batteries are located in the arm that becomes the bottom of the triangle, in use, as this provides extra weight towards the bottom of the assembly for stability.

As will now be described with respect to FIG. 6, the lights (150) in arms (112), (114) and (116) may be programmed to provide various patterns of illumination. In all of the examples, the triangle may be controlled such that a pattern of illumination comprises the arrays of lights illuminating in a sequence in which the arrays of two of the three arms are illuminated to produce a direction indicator.

Figure 6:
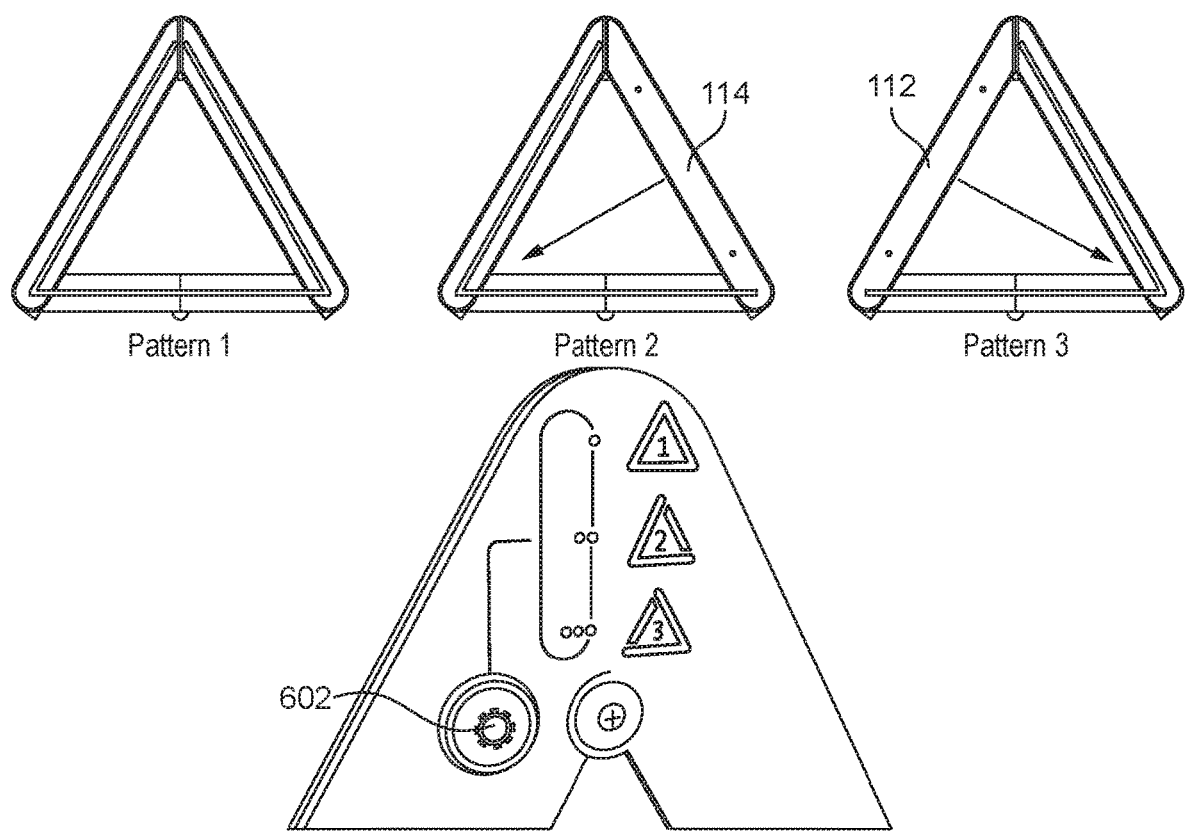
FIG. 6 shows an illustration of different illumination patterns of the arms of the warning triangle according to the embodiment of the invention and a view of the switch used to select a pattern of illumination.

In the present embodiment, the warning triangle has a default setting and three patterns of illumination, denoted in FIG. 6 by the numbers 1, 2 and 3 respectively. The default setting has all arms illuminated. The default setting may be such that unfolding the triangle automatically results in the lights illuminating according to this pattern. Selection of pattern 1 may result in the lights (150) of all three arms flashing in unison, highlighting the presence of the warning triangle to approaching motorists. Pattern 2 may result in the lights (150) of arm (112) and (116) flashing but the lights of arm (114) being powered off. This flashing pattern may indicate to oncoming motorists that they should travel left of the warning triangle in order to avoid the hazard. Pattern 3 may result in the lights (150) of arm (114) and (116) flashing but the lights of arm (112) being powered off. This flashing pattern may indicate to oncoming motorists that they should travel right of the warning triangle in order to avoid the hazard.

The flashing patterns in modes 2 and 3 may have all lights of the arrays of two arms flashing, but preferably the arrays are arranged to pulsate such that the lights appear to travel towards the bottom right or bottom left corner of the triangle. Such a pulsating pattern may be achieved by a sequence of on/off switching of the arrays in a sequence. Preferably, the lights of two of the three arms are synchronised such that the light appears to travel along two of the arms together. For example, in the patter number 2, the light of the array of arm (112) that is furthest from the base arm (i.e. the light of arm (112) nearest the top of the triangle when in use), and the light of the base arm's array that is closest to arm (114) may pulsate first, followed by the lights adjacent to them in the array. This pattern may continue along the arm until the sequence of pulsating lights reach the corner of the triangle in which the arm (112) is connected to the base arm.

In the above examples in which two of the three arms have a flashing sequence, the third arm may be turned off (array not illuminated) or the array of the third arm may be visibly different such as dimmed or even a different colour.

The pattern of illumination displayed by the warning triangle may be instructed by a control module. The control module may comprise a semiconductor chip or other appropriate circuitry and may be imbedded in the arms.

Here, a switch (602) is also provided, which, when pressed, cycles through the three patterns, allowing a user to select the desired illumination. For example, upon unfolding the triangle, the lights are illuminated according to the default setting in which all lights are on. Pressing the switch once cycles to pattern 1. The switch (602) can be pressed once again to change to pattern 2, pressed again to change to pattern 3 and then pressed for a third time to return to the default setting.

Such flexibility and control over the lights (e.g. the control module and the switch) may be provided by standard circuitry that is well known in the art and accordingly will not be discussed further.

The programming of lights (150) described above should also not be considered limiting. The electrical circuit may comprise a control module to control the lights such that they provide constant illumination or flash together, in sequence or at random. Further, each arm may be controlled separately such that each arm could provide an individual pattern of illumination. Further, the control module is not limited to being controlled by the switch (602). For example, the switch may be provided separately to the warning triangle to allow the illumination of the lights of the arms to be controlled remotely.

Further to lights (150), arms (112), (114) and (116), may also comprise reflectors. Therefore, in the event that the battery is flat or there is a circuit failure, warning triangle (100) can still be used to warn motorists.

Electrical Switch Arrangement

An electrical switch arrangement according to an embodiment of the invention will now be described in further detail with respect to FIGS. 7-9.

Figure 7:
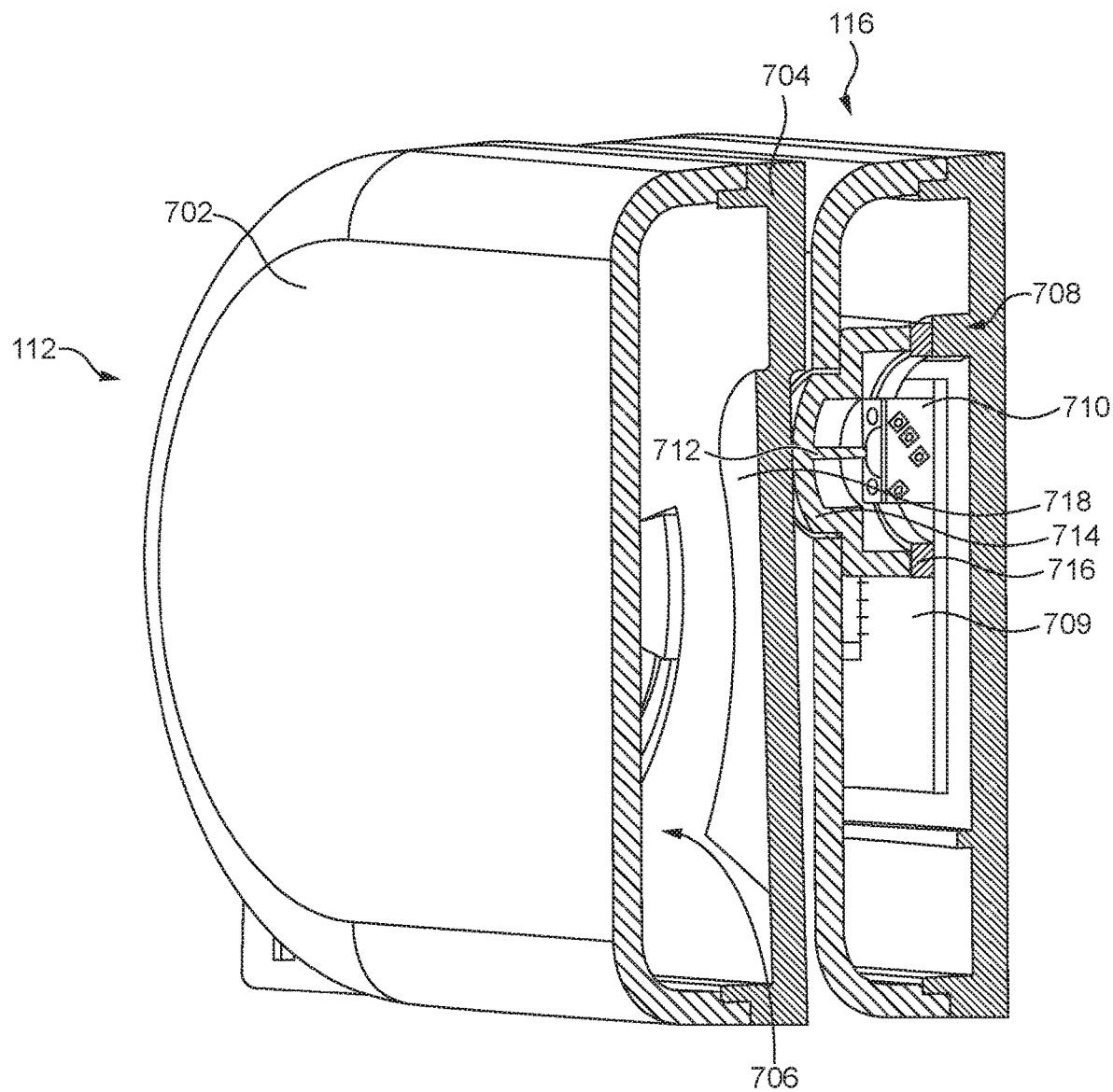
FIG. 7 shows a schematic representation of an electrical switch arrangement according to the embodiment of the invention when the warning triangle is fully folded.

FIG. 7 shows connection point (120) between the arm (112 or 114) and the bottom arm (116) when the warning triangle is in a folded state. As can be seen from FIG. 7, each arm has a front portion (702) and a rear portion (704). The front portion of each arm defines the front surface of the warning triangle when in use and the rear portion of each arm defines the rear surface of the warning triangle when in use. The front portion of an arm is connected with its corresponding rear portion along the perimeter of the arm. Both front and rear portions of the arm are shaped such that together they define an interior volume, here described as interior region (706), that runs throughout the arm.

Housed within the interior region (706) of the bottom arm (116) may be an electrical switch arrangement (708). In the present embodiment, the electrical switch arrangement (708) comprises a tactile switch (710) arranged on a printed circuit board (PCB) (709) which itself is arranged on the interior surface of the rear portion (704) of the bottom arm (116). The PCB may also comprise the control module described above.

A tactile switch may be any appropriate electrical switch that changes from an open state to a closed state when the switch experiences a change in force, such as pressure. In an open state, the tactile switch prevents the flow of current through the PCB (709) and therefore the electrical circuit of the warning triangle is not complete. In a closed state the tactile switch allows current to flow through the PCB (709) and thus completes the electrical circuit. In the present embodiment, the tactile switch is configured to transition from an open state to a closed state when a certain force is applied to the switch. For example, the tactile switch may remain in an open state up to a force of F1. Any force applied to the switch that is greater that F1 will result in the switch transitioning to a closed state.

The electrical switch arrangement may further comprise a push button (712) arranged within the interior space (706) of the bottom arm (116). The push button (712) may have a closed end which forms a circular surface. The opposing end of the push button may be open and comprise a bottom edge of the button. The bottom edge of the push button may be arranged on a strip of compressible material, here described as foam gasket (716). The foam gasket (716) is shaped to conform with the bottom edge of the push button (712) and as such forms a circular ring. The foam gasket is arranged to encircle the tactile switch and the push button (712) is arranged such that its interior volume fits over the tactile switch (710).

The circular top surface of the push button (714) protrudes through an opening in the front portion (702) of bottom arm (116) into a recessed area (716) of the adjacent rear portion (704) of arm (112). In this folded arrangement, the push button, protruding into the recessed area (718), does not make contact with the rear portion (704) of arm (112). As such, no force is exerted by arm (112) on the push button and accordingly no force is exerted by the push button on the tactile switch.

Figure 8:
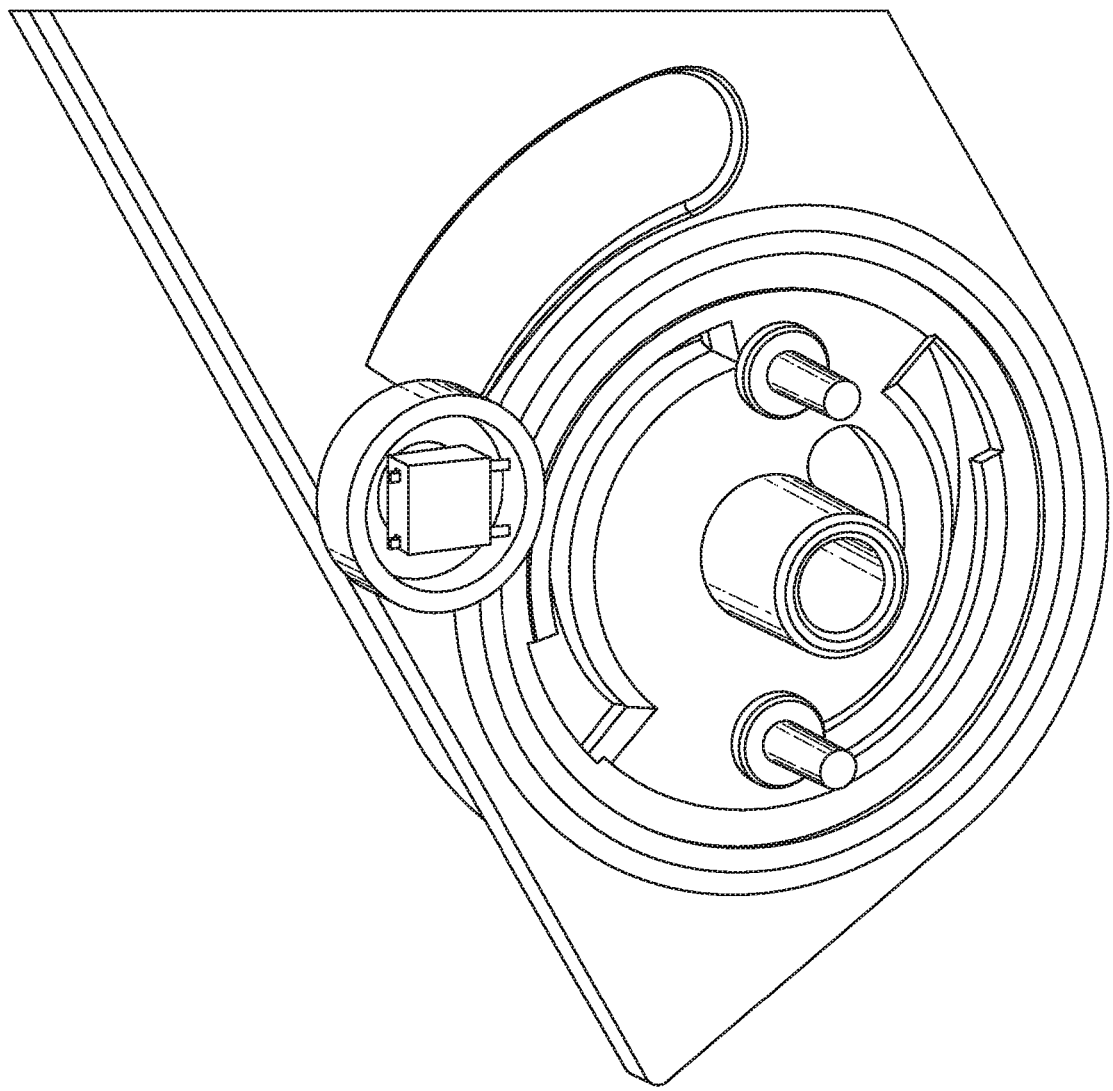
FIG. 8 shows a partially deconstructed representation of an electrical switch arrangement according to the embodiment of the invention when the warning triangle is fully unfolded.
Figure 9:
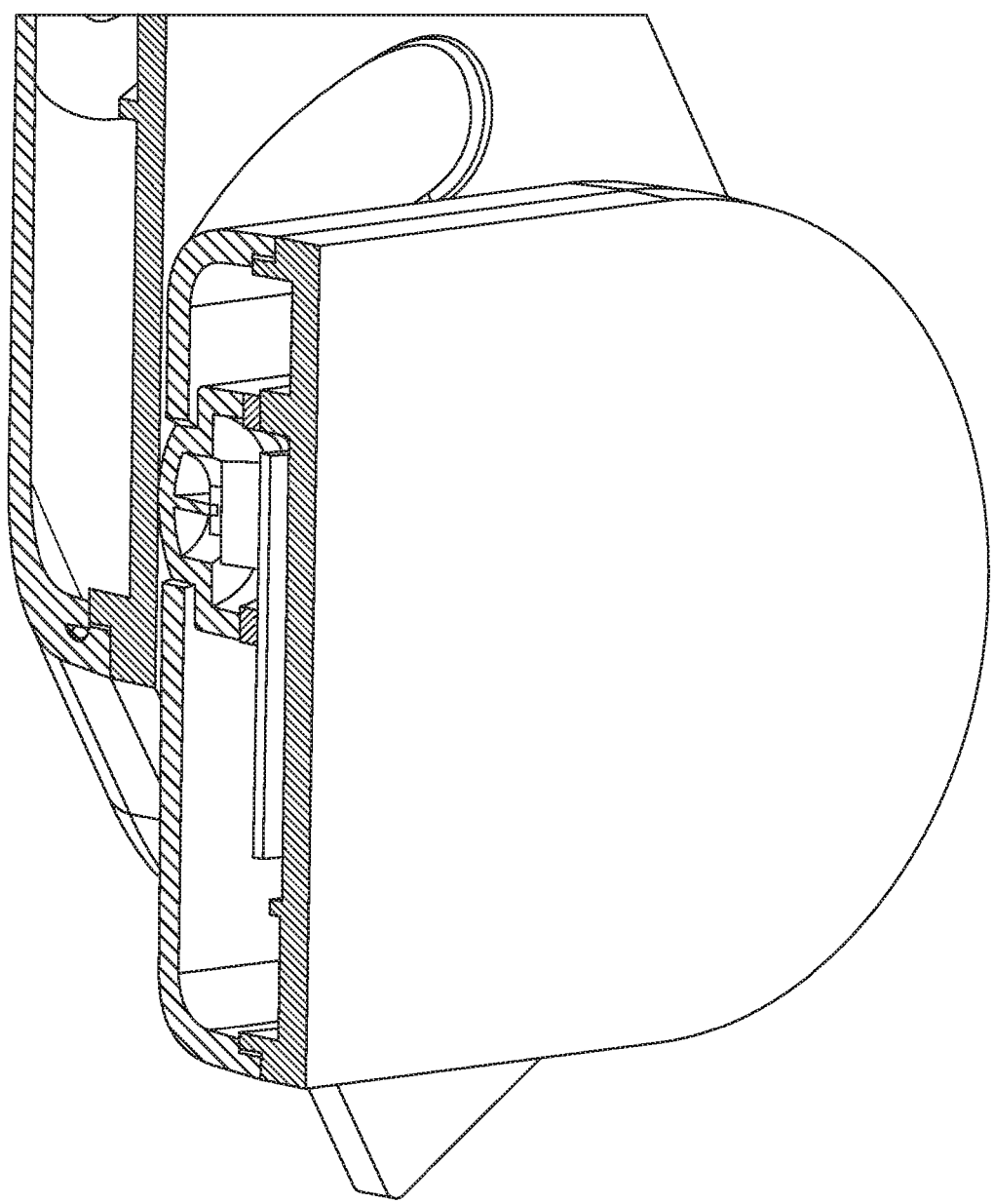
FIG. 9 shows a schematic representation of an electrical switch arrangement according to the embodiment of the invention when the warning triangle is fully unfolded.

However, as can be seen most clearly in FIG. 8, the recessed area has a variable depth which changes across the width of arm (112). Thus, as the arm (112) pivots with respect to arm (116) as the triangle unfolds, the electronic switch arrangement (708), being arranged on the bottom arm (116), may move across the recessed area (718). This results in the push button coming into contact with the rear portion (704) of the adjacent arm (112). When the triangle is fully unfolded, the electrical switch attached to the bottom arm (116) may be fully out of the recessed area (718). This may results an a sufficient force being exerted on the push button (712) to compress the foam gasket (716). As the foam gasket is compressed, the push button (712) comes into contact with the tactile switch (710). This may cause a force to be exerted on the switch that is sufficient (e.g. greater that F1) to cause the switch to transition from an open state to a closed state. Such an arrangement is shown in FIG. 9.

Thus, the electrical switch arrangement only allows current to flow through the electrical circuit of the warning triangle when the triangle is fully unfolded.

Warning Triangle Housing

With reference now to FIGS. 10-15, a housing (1000) to house the warning triangle when in a folded state will now be described. Features of the housing include a locking mechanism, a connector to form a base for the triangle and a separately accessible compartment. These features may be used alone or in combination.

Figure 11:
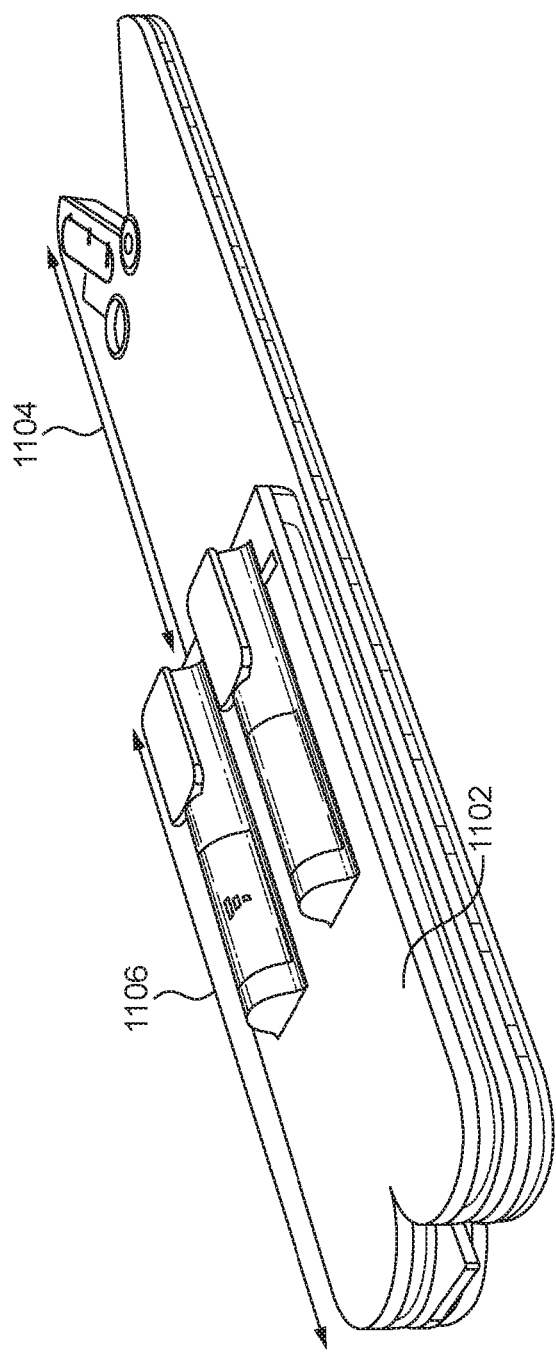
FIG. 11 shows a warning triangle according to the embodiment of the present invention in a folded arrangement.

The warning triangle assembly comprises the housing (1000). Housing (1000) comprises a rectangular container (1002) and a lid (1004), which may be made of plastic. As shown in FIG. 11, the housing (1000) has an interior region within which arms (112), (114) and (116) can fit when they are in their folded arrangement. Housing (1000) allows the warning triangle (100) to be compactly stored and easily transported.

The lid (1004) of the housing (1000) may comprise a locking mechanism, here described as rotational locking mechanism (1006). The rotational locking mechanism (1006) is in the form of a circular switch which can be rotated between two positions. The first position secures the lid (1004) to the container (1002), which can be described as a locked state for the housing. The second position allows the lid (1004) to be removed from the container (1002), which can be described as an unlocked state. As previously stated, the housing may be locked or unlocked by rotating the locking mechanism between position 1 and position 2. The locked state (position 1) secures the folded warning triangle within the housing and the unlocked state (position 2) allows the folded warning triangle to be inserted or removed from the housing.

An advantage of the locking mechanism is that the triangle is securely stored in a manner in which the triangle cannot be accidently deployed which, in combination with the switch, would cause the triangle to illuminate and waste battery power.

Figure 10:
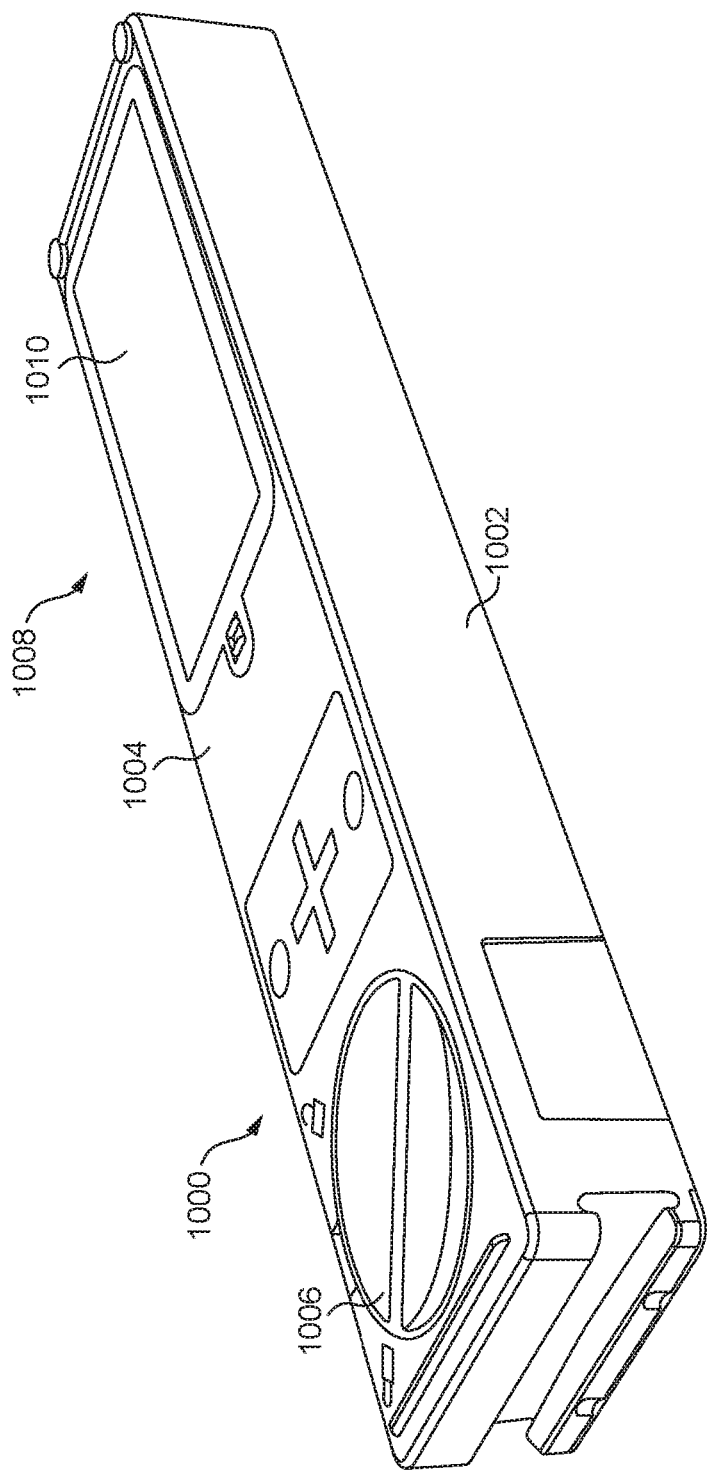
FIG. 10 shows a housing for the warning triangle according to the embodiment of the invention displaying a rotational locking mechanism and a storage compartment.
Figure 12:
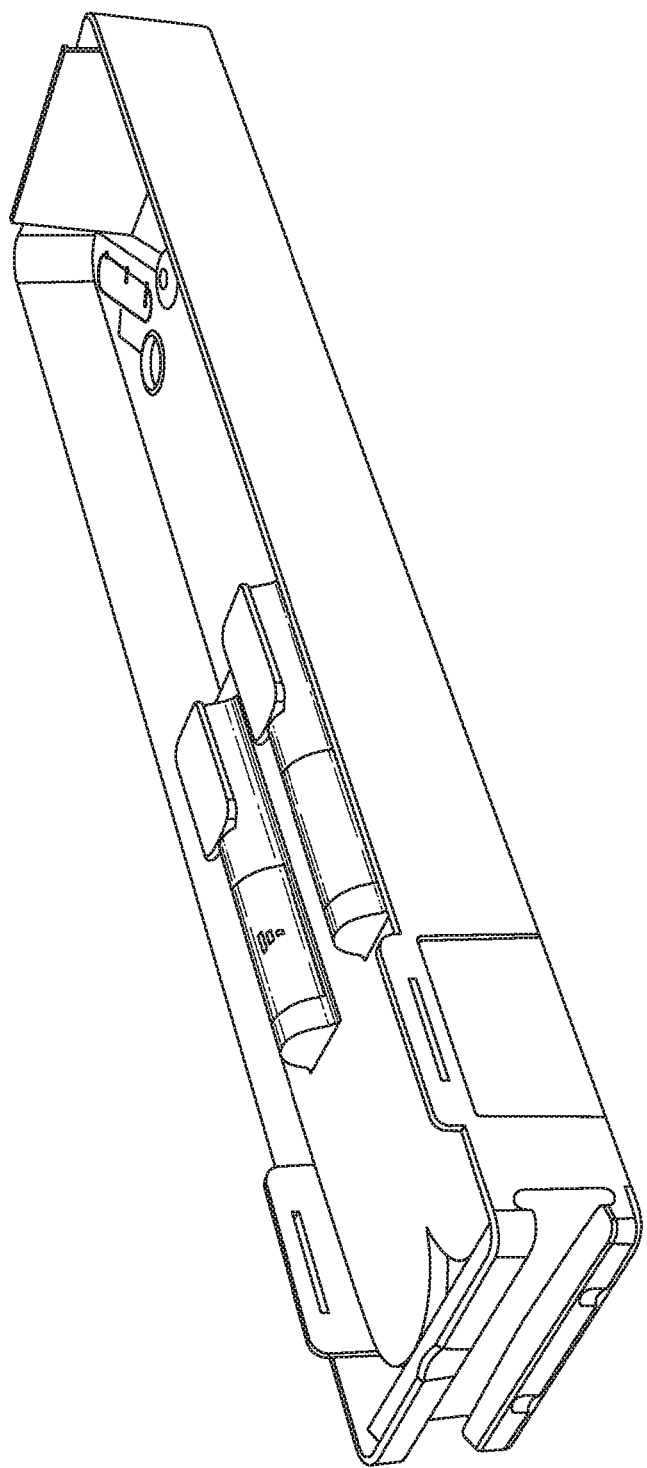
FIG. 12 shows the housing for the warning triangle according to the embodiment of the invention without a lid.
Figure 13:
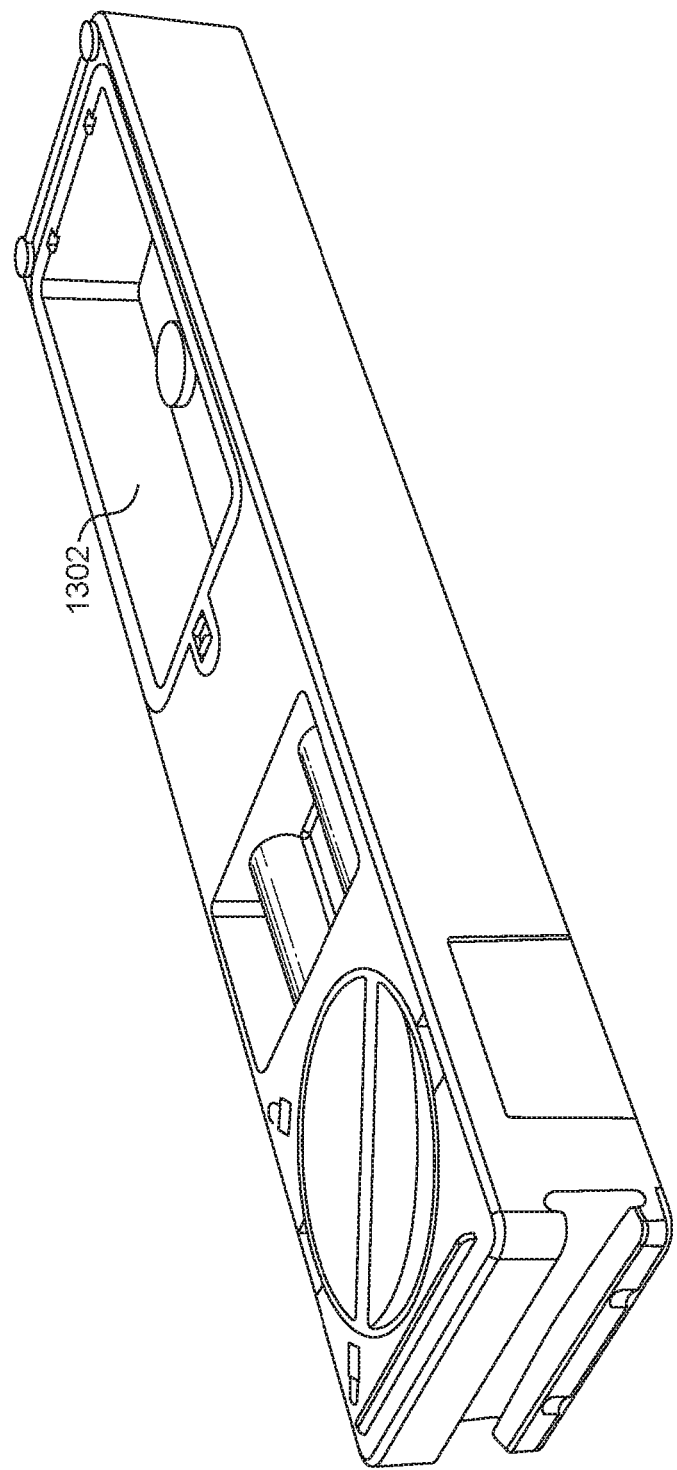
FIG. 13 shows a housing for the warning triangle according to the embodiment of the invention displaying a rotational locking mechanism and a storage compartment without a lid.

In combination with, or as an alternative to, the locking mechanism (1006), the lid (1004) may comprise an externally accessible storage compartment (1008). This compartment may comprise a storage compartment lid (1010), as shown in FIG. 10, and a storage recess (1202), as shown in FIG. 12.

As can be seen from FIG. 11, the folded warning triangle (1102) has two sections, here described as a first section (1104) and a second section (1106). In the first section (1104), the bottom arm (116) does not overlap with the remaining two arms (112) and (114). In the second section (1106) the bottom arm (116) does overlap with the remaining two arms. As there is no overlap between these arms in the first section (1104), the first section of the folded warning triangle is thinner than the second section (1106). Thus, when the folded warning triangle is fitted within the container, the portion of the container above the first section (1104) is not occupied by the warning triangle. This is shown in FIG. 12.

The storage recess (1302) is positioned on the lid such that it aligns with the first section (1104) of the folded warning triangle and thus fits within the portion of the container (1004) that is not occupied by the warning triangle. The storage recess therefore efficiently utilises this free space within the container and provides a storage compartment which can be accessed externally without needing to remove the lid (1004).

Figure 14:
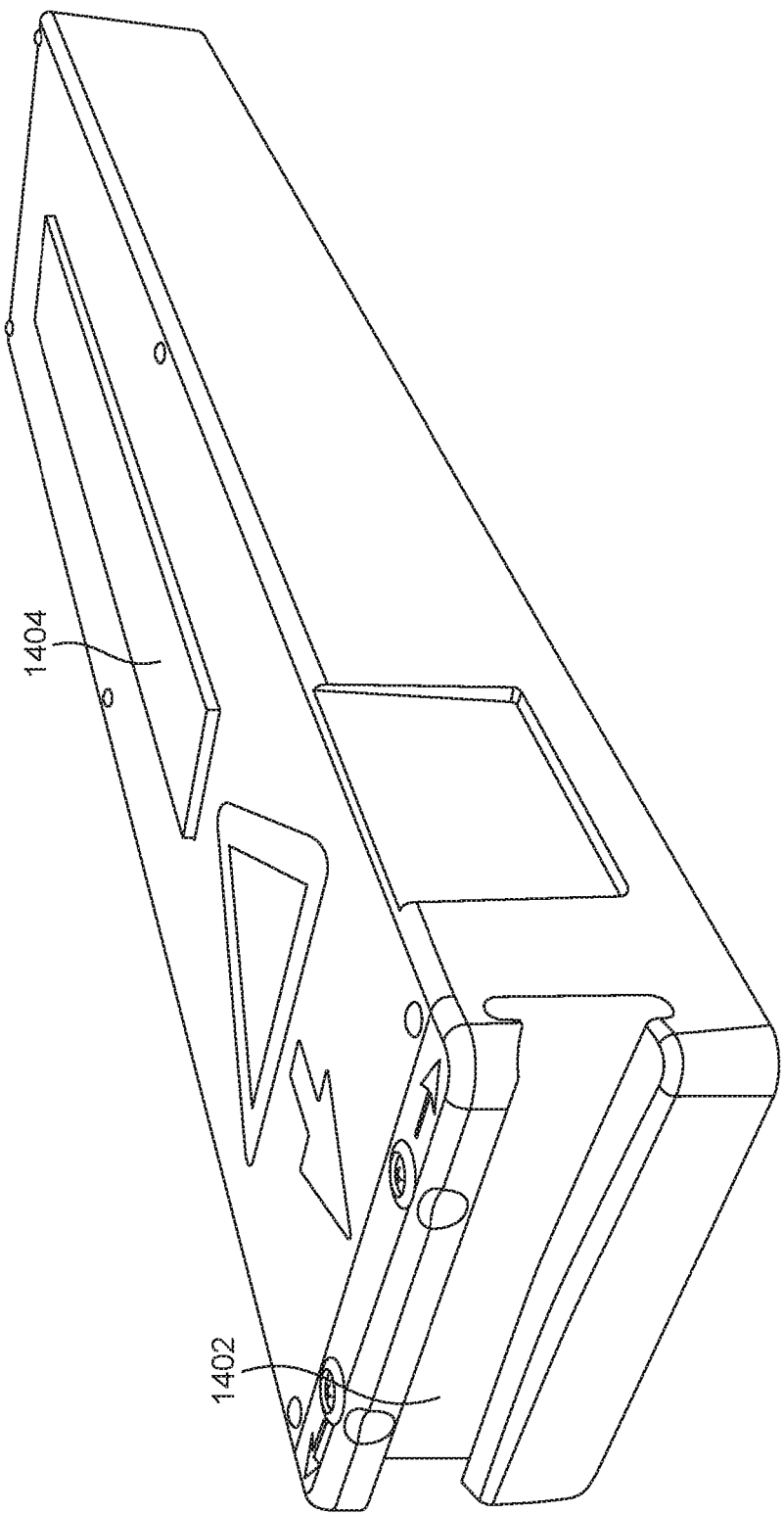
FIG. 14 is a different view of the housing for the warning triangle according to the embodiment of the invention.
Figure 15:
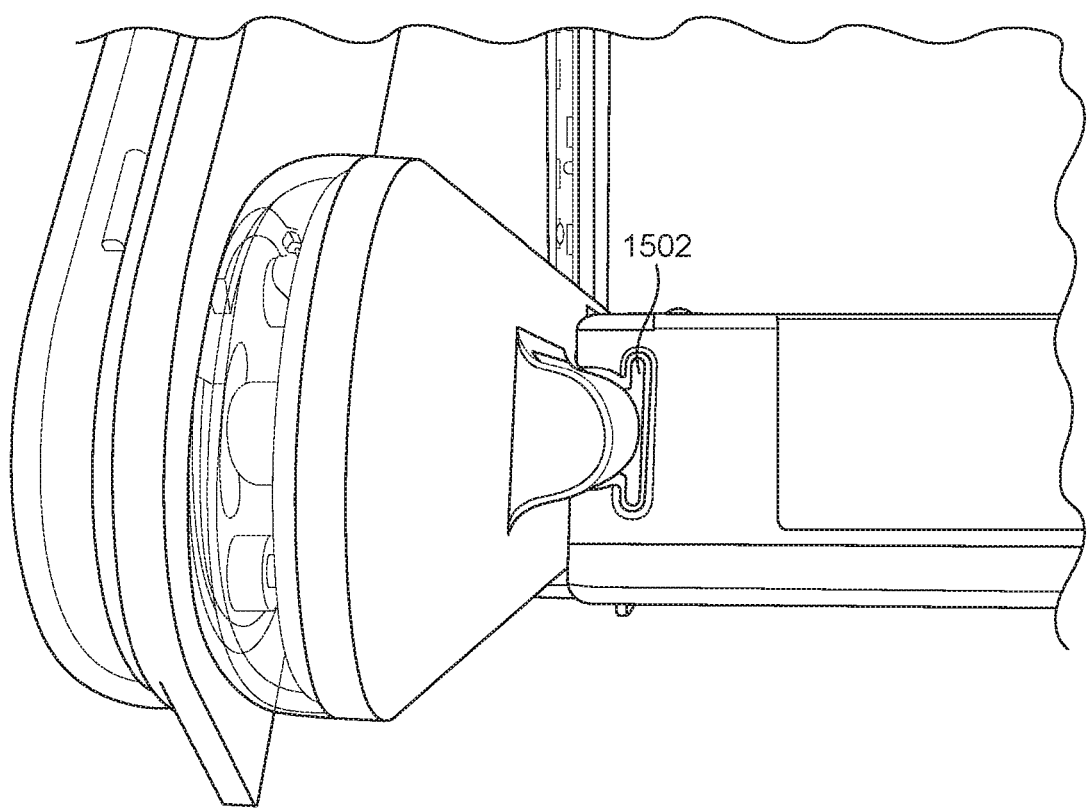
FIG. 15 is a view of the housing connected to the warning triangle.

Further, housing (1000) may be connectable to the bottom arm (116) of the warning triangle (100) by a support connector and thus act as a support for the warning triangle. In the present embodiment, the support connector is a push fit connector (1402) most clearly shown in FIG. 14, which displays the housing (1000) with the lid (1004) facing downwards. This push fit connector (1402) is configured to connect to a corresponding connector (1502) positioned on the rear portion of the bottom arm (116), as shown in FIG. 15. The support connector (1402) may be attached to the bottom arm by laterally sliding the connector onto the corresponding connector (1502) of the bottom arm. Both connectors (1402), (1502) are shaped such that sliding the connector (1402) onto the connector of the base securely connects the housing to the warning triangle. In other words, connector (1402) comprises a slot and connector (1502) comprises a protrusion. The slot of connector (1402) is shaped such that it can be slid onto the protrusion of connector (1502) to secure the base arm to the housing. In the present embodiment, connector (1502) comprises two protrusions, one on each arm portion of bottom arm (116), as can be most clearly seen in FIG. 5. By sliding the connector of the housing onto the protrusions of the two arm portions the two arms portions are effectively locked in position, further increasing the stability of the assembly. Further, the batteries of the warning triangle may be housed within the protrusions of the connector (1502). As such, the protrusions of the bottom arm provides a compact and efficient housing for the batteries.

Optionally, the container may further comprise a strip of Velcro (1404) or other appropriate adhesive material. This strip may be positioned on the bottom side of the container, as shown in FIG. 14, and may be used to fasten the housing to a vehicle (for example, the vehicle's boot), to keep the housing in place during transportation.

It should be appreciated that housing (1000) is not limited to connecting to arm (116) at one end. The top surface of the housing may connect to the bottom edge of the arm at the base of the triangle at a connection point that is positioned towards the centre of the housing. The housing may be made with a magnetic base or a sucker or a plurality of suckers attached to the base, or made with neither.

Figure 16:
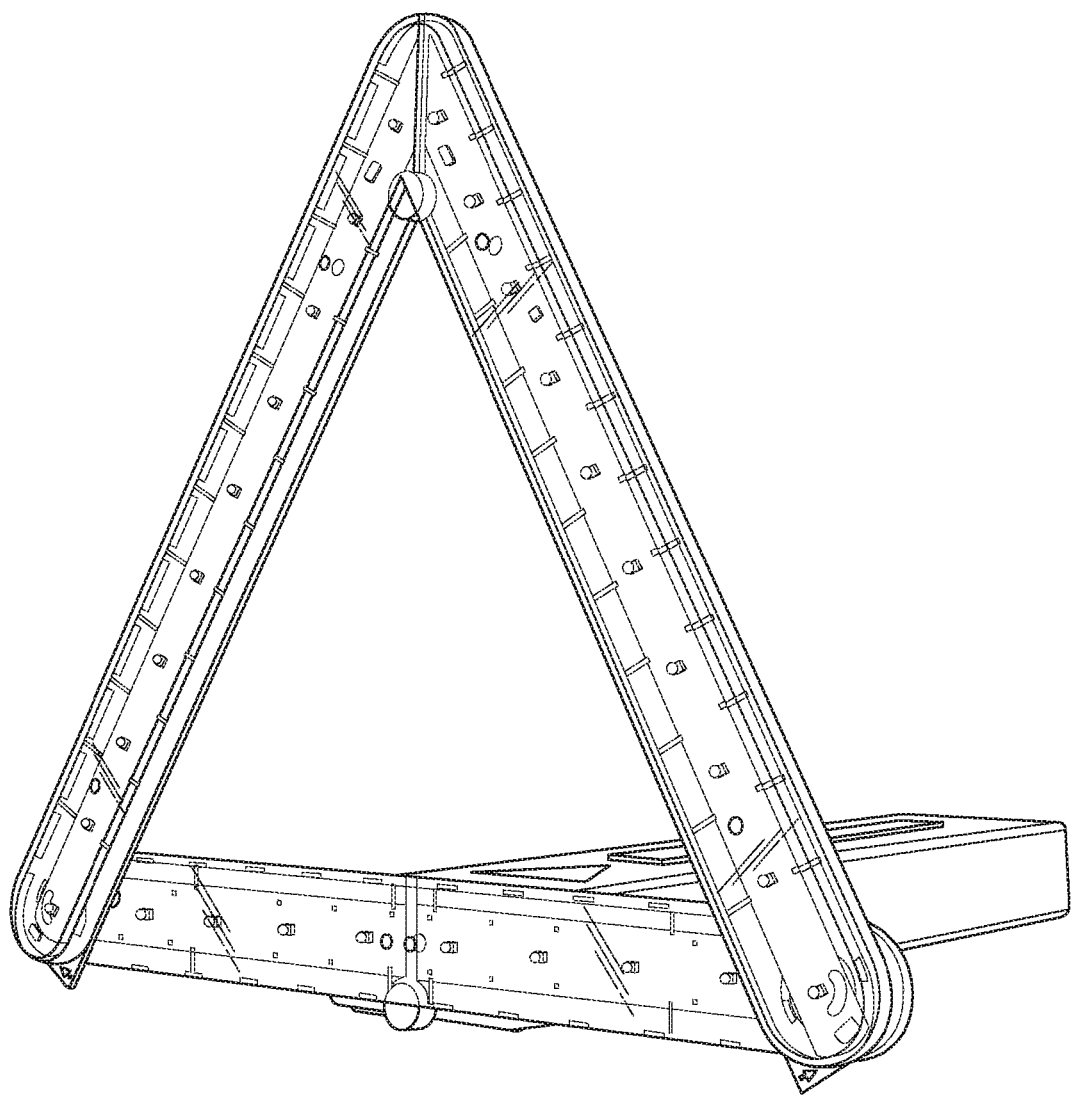
FIG. 16 shows the warning triangle assembly according to the embodiment of the invention.

Thus a warning triangle assembly is provided that provides a device that is easy to store and transport, stable when fully assembled, highly visible in all lightings and weather conditions, and that provides motorists with a direction to travel in order to avoid an upcoming hazard. Such an arrangement is shown in FIG. 16.

As noted above, the aspects of the warning triangle assembly, in particular the illumination aspect, the electronic switch aspect and the housing aspect may be used in combination or separately. Further to this, the specific features of the housing described above may be used in combination or separately, and may be combined separately or together with each of the other aspects of the assembly. As such, a variety of combinations are possible.

For example, it should be appreciated that the warning triangle (100) described above is not limited to be used in combination with the housing (1000) described above. For example, the warning triangle (100) may be provided with other appropriate housing that may or may not double as a base, or no base may be provided at all. In such a case, means of support for providing stability when in use, may be provided on the warning triangle such as legs or an integrated base. Further, warning triangle (100) may be used in combination with a variation of housing (1000), for example a housing with the above rotational locking mechanism and sliding connector but without the externally accessible storage compartment. Alternatively, another suitable locking mechanism may be used, such as a lock and key combination, with the sliding connector and/or the externally accessible storage area. Or no locking mechanism may be used at all and the housing may comprise the sliding connector and/or the externally accessible storage compartment. In an alternative arrangement, which does not comprise the sliding connector, any appropriate connector, such as a push fit or clip connector, may be used in combination with the externally accessible storage compartment and/or the rotational locking mechanism.

Further, the housing (1000), or the variations on housing (1000) described above, are not limited to be used with the warning triangle (100). Other appropriate foldable warning triangles may be used, for example a warning triangle that does not comprise the electrical switch arrangement and/or lights for illuminating the arms. Further, variations of warning triangle (100), which can be used in combination with housing (1000) or variations thereof, are conceivable. For example, for a warning triangle comprising the illumination feature described above, any appropriate electronic switch may be used, for example a contact connection or magnetic reed switch arrangement.

An example of a further variation is an embodiment having the illumination functionality but in which the sliding connector (1402) may be used or any appropriate connector may be used. For example, the connector may be in the form of fitting pegs, positioned at one end of housing 1000, which fits into a corresponding support connector in the form of holes, positioned at the back of arm (116). Alternatively, in an embodiment having illumination functionality, the rotational locking mechanism (1006) may be used for the housing, or any appropriate locking mechanism may be used, such as a lock and key combination. Alternatively, a locking mechanism may not be used at all.

The invention claimed is:

1. A foldable warning triangle assembly comprising:
three arms configurable as a triangle, wherein the three arms are pivotably connected together at pivot points such that they can pivot into a collapsed arrangement without disconnecting the three arms, wherein an arm of the three arms comprises two arm portions pivotably connected together about a first pivot point and the remaining two arms are pivotably connected about a second pivot point, wherein the first and second pivot points are arranged to allow the three arms to pivot into the collapsed arrangement without disconnecting the three arms;
an electrical switch within an interior region of a first arm of the three arms arranged adjacent a pivot point between the first arm of the three arms and a second arm of the three arms, a surface of the second arm comprising a recessed area of variable depth, the surface arranged such that the electrical switch moves across the recessed area as the first arm pivots in relation to the second arm, wherein the surface is arranged to apply force on the electrical switch as the electrical switch moves across the recessed area such that the electrical switch closes when the three arms are fully configured as a triangle thereby completing an electrical circuit of the warning triangle.

2. An assembly according to claim 1, wherein the first pivot point is arranged midway along the arm.

3. An assembly according to claim 1, wherein each of the arms comprise an array of lights connected together by the electrical circuit.

4. An assembly according to claim 3, wherein the assembly further comprises a control module connected to the array of lights of each arm, the control module arranged to control the illumination of the array of lights of each arm to provide a pattern of illumination.

5. An assembly according to claim 4, wherein the pattern of illumination indicates a direction.

6. An assembly according to claim 4, wherein the pattern of illumination comprises the arrays of lights illuminating in a sequence in which the arrays of two of the three arms are illuminated to produce a direction indicator.

7. An assembly according to claim 1, wherein power is provided to the electrical circuit when the electrical switch is closed.

8. An assembly according to claim 1, wherein the electrical switch comprises a tactile switch arranged such that a force is exerted on the tactile switch when the three arms are fully configured as a triangle.

9. An assembly according to claim 8, wherein the tactile switch has a button biased such that the electrical switch is open until the triangle is unfolded.

10. An assembly according to claim 1, wherein each arm further comprises a support member arranged such that when the three arms are fully configured as a triangle, each support member is in contact with the ground.

11. An assembly according to claim 1, wherein the assembly further comprises a housing having an interior, wherein the three arms, when in the collapsed arrangement, can fit within the housing.

12. An assembly according to claim 11, wherein the housing further comprises a locking mechanism for securing the three arms within the housing, the locking mechanism comprising a locked state and an unlocked state, wherein, when the locking mechanism is in the locked state, the three arms cannot be inserted into or removed from the housing, wherein the locking mechanism comprises a rotatable switch arranged on the housing, wherein the state of the locking mechanism can be changed by rotating the rotatable switch.

13. An assembly according to claim 11, wherein the housing further comprises a first opening through which it receives the warning triangle when folded and wherein the housing further comprises an externally accessible storage compartment accessible through a second opening.

14. An assembly according to claim 13, wherein the first opening has a lid and the second opening is arranged through the lid such that, when the lid is connected to the container, the externally accessible storage compartment is a portion of the housing that is not occupied by the three arms when the three arms are within the housing.

15. An assembly according to claim 11, wherein the housing has a support connector on the external surface thereof arranged to connect to a corresponding support connector of the warning triangle by sliding of the housing relative to the triangle such that, when connected, the housing provides a base for the warning triangle.

16. An assembly according to claim 15, wherein the support connector of the housing comprises a slot and the support connector of the triangle comprises a protrusion arranged to slide along the slot.

17. An assembly according to claim 16, wherein the support connector of the triangle comprises a protrusion on each of two arm portions arranged so that the two protrusions slide into the slot of the housing.

18. An assembly according to claim 16, wherein the protrusion is arranged to house a battery of the triangle.

19. An assembly according to claim 15, wherein the support connector of the arm at the base of the triangle is connectable to the support connector of the housing at one end of the housing.

\* \* \* \* \*